United States Patent
Lin et al.

(10) Patent No.: US 10,619,225 B2
(45) Date of Patent: Apr. 14, 2020

(54) DETOXIFICATION TREATMENT METHOD FOR EXTRACTING AND RECYCLING CHROMIUM FROM HEXAVALENT CHROMIUM-CONTAINING RESIDUES

(71) Applicant: South China University of Technology, Guangdong (CN)

(72) Inventors: Zhang Lin, Guangdong (CN); Weizhen Liu, Guangdong (CN); Xueming Liu, Guangdong (CN); Wencong Rong, Guangdong (CN)

(73) Assignee: South Carolina University of Technology, Guangdong (CN)

( * ) Notice: Subject to any disclaimer, the term of this patent is extended or adjusted under 35 U.S.C. 154(b) by 0 days.

(21) Appl. No.: 16/074,155

(22) PCT Filed: Jun. 13, 2017

(86) PCT No.: PCT/CN2017/088154
§ 371 (c)(1),
(2) Date: Jul. 31, 2018

(87) PCT Pub. No.: WO2018/001090
PCT Pub. Date: Jan. 4, 2018

(65) Prior Publication Data
US 2019/0194777 A1    Jun. 27, 2019

(30) Foreign Application Priority Data

Jun. 30, 2016  (CN) .......................... 2016 1 0502493

(51) Int. Cl.
*C22B 7/00* (2006.01)
*C01G 37/02* (2006.01)

(52) U.S. Cl.
CPC .............. *C22B 7/007* (2013.01); *C01G 37/02* (2013.01); *Y02P 10/234* (2015.11)

(58) Field of Classification Search
CPC ................................ C01G 37/02; C22B 7/007

USPC ..................................................... 423/57, 595
See application file for complete search history.

(56) References Cited

U.S. PATENT DOCUMENTS

| | | | | |
|---|---|---|---|---|
| 5,093,089 A | * | 3/1992 | Alford | ..................... C01B 11/14 423/184 |
| 2004/0086138 A1 | * | 5/2004 | Kuth | ....................... A61F 11/08 381/72 |

OTHER PUBLICATIONS

CN 101209873 machine translation of the description (Year: 2008).*
CN 102191390 machine translation of the description (Year: 2011).*
CN 1401800 machine translation of the description (Year: 2003).*
Notification to Grant Patent Right for Invention. Chinese application 201610502493.9. dated Nov. 6, 2017.
International Search Report and Written Opinion for PCT/CN2017/088154 with English translation of ISR. dated Sep. 7, 2017. 8 pages.

* cited by examiner

*Primary Examiner* — Tima M. McGuthry-Banks
(74) *Attorney, Agent, or Firm* — Joseph E. Maenner; Maenner & Associates, LLC

(57) ABSTRACT

A method for extracting and recycling chromium from hexavalent chromium-containing residues includes the following steps: 1) adding water to the hexavalent chromium-containing residues and mixing uniformly; 2) adding sodium sulfate, sodium chlorate and sulfuric acid to a solution obtained in step 1) and stirring sufficiently to obtain a mixed liquid; 3) treating the mixed liquid by a hydrothermal method or direct heating; 4) after the heating treatment, naturally cooling a solid-liquid mixture to room temperature for holding; 5) separating solid residues and a chromium-containing supernatant, and washing filtered residues with water and then drying; 6) precipitating the supernatant and the water used for washing the filtered residues with a precipitant CaCl2, then centrifugally washing, dewatering and drying the precipitates; and 7) recycling a chromium-containing solution for returning to a work section, or for a treatment of recycling chromium.

8 Claims, No Drawings

DETOXIFICATION TREATMENT METHOD FOR EXTRACTING AND RECYCLING CHROMIUM FROM HEXAVALENT CHROMIUM-CONTAINING RESIDUES

TECHNICAL FIELD

The present invention belongs to a field of a clean treatment and resource recycling of chromium-containing residues, and specifically relates to a detoxification treatment method for extracting and recycling chromium from hexavalent chromium-containing residues.

BACKGROUND

Generally, hexavalent chromium-containing residues are sticky and have high moisture content and it is difficult to dissolve and separate the hexavalent chromium from the residues by direct leaching. However, chromium-containing residues are subjected to weathering, washing and soaking by rainwater for long period during the transport arid outdoor pilling, and a large amount of hexavalent chromium ions will be wasted gradually and released to the environment, thereby polluting the underground water, rivers and lakes, and seriously affecting aquatic products, farmlands and various creatures, and, then humankind. On the other hand, chromium is a strategic metal which ranks first. Chromium and its compounds may be extensively used in various fields of the industrial manufacture, belonging to a necessary raw material in metallurgical industry, metal processing, electroplating, leather making, textile, dye and fire retardant materials. However, China is lack of chromium mine resources, with a present proven reserves accounting for 0.825% of a total reserves worldwide, belonging to a scarce resource. Therefore, treatment of hexavalent chromium-containing residues becomes to challenge requiring to be solved urgently in environmental protection. A relatively ideal method can not only solve the problem of chromium pollution, but also turn waste into treasure, harm into good and achieve resources as the pollution is reduced, promoting development and environmental protection simultaneously.

Aiming at the treatment of chromium-containing residues, overseas and domestic researches have developed various treatment methods, of which a main concept is to convert the hexavalent chromium which is soluble and highly toxic into trivalent chromium and to bury it. Wet detoxification is mostly used. However, such method has drawbacks that the chromium cannot be recycled, the reduced trivalent chromium will be oxidized to hexavalent chromium as the surroundings change, with incomplete detoxification, and it is difficult to apply the treated residues and takes lots of lands for stockpiling. Industrially, chromium-containing residues are often used as raw materials for producing architectural ornament materials, ceramics and glass-ceramics. Chromium-containing residues can be effectively used, but the chromium resource cannot be effectively recycled.

A preferred method is to leach and separate the hexavalent chromium and then treat the filtered residues, so that not only chromium can be recycled but also the filtered residues can be used comprehensively. CN patents "Process flow for treating leached-out chromium residue" (CN1085832A) and "Method for comprehensive uses by dissolving chromium residue to eliminate toxicity" (CN1201836A), leach out water-soluble hexavalent chromium directly with water, CN patent "method for recycling hexavalent chromium resource from chromium-containing residues" (CN102191390A) leaches out water-soluble and acid-soluble hexavalent chromium with sulfuric acid or hydrochloric acid at normal temperature, improving the leaching-out of hexavalent chromium accordingly, but with 60%-80% of hexavalent chromium resource being collected from the chromium-containing residues, which cannot recycle the chromium resources efficiently or detoxify the chromium-containing residues completely, with an environmental hidden danger remained, CN patent "Process for processing, recycling and reusing chromium-containing residues and effluent" (CN102699006A) nearly completely dissolves the chromium-containing residues with acid at normal temperature, then adds different precipitants respectively, and precipitates and separates mixed ions in the solution. Such method demands a big consumption of chemical reagents such as acid and precipitant, with complicated process and relatively high treatment cost.

SUMMARY OF THE INVENTION

Aiming at the difficulty in treating hexavalent chromium-containing residues, the present invention provides a detoxification treatment method for extracting and recycling chromium from hexavalent chromium-containing residues, which may recycle the hexavalent chromium sufficiently and control chromium pollution effectively without a secondary pollution, with simple process, low investment, quick effect and complete detoxification. Chromium recycled by the above method can be reused in the production or made into products, and can be used in other industries, such as coating, pigment and papermaking, to realize turning waste into treasure. Solid residues obtained by the method according to the present invention can be used in industries such as rubber, plastic, fertilizer, pesticide, paint, textile and papermaking.

The objective of the present invention is realized by the following, technical solution.

A detoxification treatment method for extracting and recycling chromium from hexavalent chromium-containing residues comprises steps as follows:

1) adding water to the hexavalent chromium-containing residues and mixing uniformly.

2) adding mineralizers to a solution obtained in step 1) and stirring sufficiently to obtain a mixed liquid; and the mineralizers are sodium sulfate, sodium chlorate and sulfuric acid;

3) treating the mixed liquid obtained in step 2) by a hydrothermal method or direct heating;

4) naturally cooling a solid-liquid mixture obtained in step 3) to room temperature for holding;

5) separating solid residues and a chromium-containing supernatant, and washing filtered residues with water and then drying;

6) precipitating the supernatant and the water used for washing the filtered residues with a precipitant $CaCl_2$, then centrifugally washing, dewatering and drying the precipitates; and 7) recycling a chromium-containing solution for returning to a work section, or for a treatment of recycling chromium.

Further, a solid-to-liquid ratio (w/w) after water is added to the hexavalent chromium-containing residues in step 1) is 1:0.5-1:10.

Further, the mineralizers in step 2) are sodium sulfate, sodium chlorate and sulfuric acid.

Further, sodium sulfate in step 2) in the mixed liquid has a concentration of 0.1 mol/L-1 mol/L.

Further, sodium chlorate in step 2) in the mixed liquid has a concentration of 0.1 mol/L-1 mol/L.

Further, the mixed liquid in step 2) has a pH value of 1-5.

Further, a temperature of the hydrothermal method or direct heating in step 3) is controlled between 20° C. and 200° C.

Further, a time for heat preservation in step 3) is 2 to 10 hours.

Further, a time for holding in step 4) is 0.5 to 48 hours.

Further, the treatment of recycling chromium in step 7) has specific steps as follows: adding a reductant to the chromium-containing solution, with hexavalent chromium in the solution being reduced to trivalent chromium, then adding a precipitant NaOH to generate precipitate of Cr(OH)$_3$, and finally calcining the precipitate of Cr(OH)$_3$ into Cr$_2$O$_3$.

Further, the reductant is sodium sulfide or sodium bisulfite.

A detoxification treatment method for extracting and recycling chromium from hexavalent chromium-containing residues comprises steps as follows:

(1) mixing the hexavalent chromium-containing residues with water uniformly in a solid-to-liquid ratio of 1:0.5-1:10 (w/w), then adding sodium sulfate, sodium chlorate and sulfuric acid, and adjusting the pH value to 1-5;

(2) stirring sufficiently to fully mix the residues with the solution;

(3) setting a temperature between 50° C. and 200° C., with the time for heat preservation of 2 to 10 hours with stirring or without stirring;

(4) stopping heating to let the solution be cooled naturally, with the time for holding of 0.5 to 48 hours, (5) after the hydrothermal treatment or the direct heating treatment, the solid residues precipitating at the bottom, while the supernatant having a relatively high concentration hexavalent chromium;

(6) filtering and separating the solid residues and the chromium-containing supernatant, and washing, dewatering and drying the solid residues; and (7) removing excess sulfate ions from the separated supernatant with a precipitant CaCl2, then the supernatant and the water with which the filtered residues are washed, may be returned to a work section, or subjected to a treatment of recycling chromium.

The, present invention provides a detoxification treatment method for extracting and recycling chromium from hexavalent chromium-containing residues, with its principle as follows:

Original residues mainly contain fine particles of calcium sulfate dihydrate which adsorb sodium chloride, sodium chromate and so on. In the present invention, when the mineralizers are added during the hydrothermal treatment or the direct heating treatment, hexavalent chromium in the chromium-containing residues is more likely to be dissolved in the water phase under an acidic condition. Whereas most of calcium sulfate remains in the solid phase, recrystallizes and grows, and thereby the solid particles grow with a decreased specific surface area, achieving that hexavalent, chromium is desorbed and separated from the particle surface.

After the original residues are subjected to the treatment of above methods, detoxified filtered residues are obtained of which a main component is calcium sulfate dihydrate. After the heating treatment, the treated reaction system is cooled naturally and subjected to holding for a period, rather than first separating the solid residues and the chromium-containing supernatant immediately. The reason of natural cooling is that if shock cooling is performed, calcium sulfate hemihydrate which is stable at high temperature may rapidly turn into calcium sulfate dihydrate which is stable at low temperature, resulting in hardened slurry and, caking which brings difficulties in the treatment process. Controlling a time for holding may regulate a growth extent of calcium sulfate crystals in the residues. The shorter the time for holding after the hydrothermal treatment or heating treatment, the smaller the particles of treated residues and the stronger the ability of adsorbing hexavalent chromium, and thus, more water for washing is demanded and the recycle may be more difficult. On the contrary, the longer the time tor holding, the bigger the particle size of treated residues, and an adsorption ability of calcium sulfate for hexavalent chromium may be reduced, resulting in that it is more readily to wash and separate hexavalent chromium with less water for washing, and the recycle of residues is more convenient. However, if the time for holding is too long, color of the treated residues may turn yellowish which affects the effect of treating residues.

After the hydrothermal method or the direct heating treatment and the aging treatment, the particle size of calcium sulfate in the residues increases to some extent, and properties of the residues change as it, i.e. the absorption on the particle surface reduces and chromate ions are more likely to be desorbed and dissolved in water; meanwhile a specific gravity of particles increases, and the separation of solid and liquid becomes easier. Through the treatment of above methods, the detoxified residues are subjected to a chromium-leaching test according to national standard (HJ/T 299-2007 leaching toxicity method for solid waste-sulfuric-nitric process). A content of the leached hexavalent chromium is less than 3 mg/L and a content of total chromium is less than 9 mg/L, which are below the limit of national standard (HJ/T 301-2007) for general industrial solid residues.

Major cations in the treated supernatant are sodium ions and calcium ions, and major anions are chromate ions and sulfate ions. In order to recycle the chromium-containing solution, a precipitant is added to remove the sulfate ions, thereby the chromium-containing solution mainly comprising sodium ions and chromate ions.

Compared to the prior art, the present invention has following advantages and technical effects:

The present invention solves problems of hexavalent chromium-containing residues, such as difficult leaching process, high cost, difficult recycling of chromium and so on, and after being treated, the supernatant from the treated residues is reused in the industrial production or making into chromium salt products. The content of leached hexavalent chromium, from the treated residues is below the limit of national standard (HJ/T 301-2007) for general industrial solid residues, with high purity for using in industries such as rubber, plastics, fertilizer, paint, textile and papermaking. The treatment method according to the present invention may achieve full-residue utilization with, simple process, low cost, quick effect, large treating capacity and complete detoxification, and has relatively high social benefit and economic benefit.

DETAILED DESCRIPTION OF THE PREFERRED EMBODIMENT

The present invention is further described in connection with embodiments, but the implementations of the present invention are not limited by these.

Embodiment 1

1) 0.5 ton of hexavalent chromium-containing residues were added to a hydrothermal kettle, then water was added until a solid-to-liquid ratio (w/w) was 1:1, with sufficient stirring, and sodium sulfate, sodium chlorate and sulfuric acid were added, and a concentration of sodium sulfate was adjusted to 1 mol/L and a concentration of sodium chlorate was adjusted to 1 mol/L in the system. A pH value was 1. A temperature was set at 50° C. and a time for heat preservation was 2 hours.

2) 2 hours later, heating was stopped and the system was cooled naturally to room temperature and held for 24 hours, 3) After the holding, a supernatant containing hexavalent chromium was poured out. Residues which had been subjected to the hydrothermal treatment were subjected to centrifugal washing and dewatering. Filtered residues were dried to obtain white solids or white and yellowish solids.

4) A suitable amount of $CaCl_2$ was added to the poured supernatant and the water used for washing the filtered residues, to remove excess $SO_4^{2-}$ from the solution, followed by stirring until white precipitate generated. The precipitate was subjected to centrifugal washing, dewatering and drying.

5) The chromium-containing solution after the precipitate treatment was reused in the production or collected in a waste water treatment station to perform restore, recycle and purification treatments. Reductants (such as sodium sulfide and sodium bisulfite) were added to reduce the dissolved hexavalent chromium into trivalent chromium, and a precipitant NaOH was added to generate precipitates of $Cr(OH)_3$. The treated water could reach the national standard off drainage. During the whole process, water could be recycled in the system.

6) Final products were residues mainly containing calcium sulfate and chromic mud mainly containing $Cr(OH)_3$, respectively. The residues of calcium sulfate could be used as raw materials in industries such as rubber, plastics, fertilizer, paint, textile and papermaking. The chromic mud could be calcined to $Cr_2O_3$, to realize recycling of chromium.

A concentration of the leached hexavalent chromium from the original chromium-containing residues in this embodiment was 273 mg/L, and a concentration of the leached hexavalent chromium from the treated filtered residues was 1.93 mg/L.

Embodiment 2

1 ton of hexavalent chromium-containing residues were added to the hydrothermal kettle, then water was added until the solid-to-liquid ratio (w/w) was 1:0.5, with sufficient stirring, and sodium sulfate, sodium chlorate and sulfuric acid were added. The concentration of sodium sulfate in the system was adjusted to 0.1 the concentration of sodium chlorate was 1 mol/L and the pH value was 3, with sufficient stirring, and the hydrothermal kettle was turned off. The temperature was set at 150° C. and the time for heat preservation was 6 hours. After the heating was stopped, the system was held for 48 hours. Other process was the same as that in the Embodiment 1.

The concentration of the leached hexavalent chromium from the, original chromium-containing residues in this embodiment was 265 mg/L, and the concentration of the leached hexavalent chromium from the treated filtered residues was 1.52 mg/L.

Embodiment 3

1 ton of hexavalent chromium-containing residues were added to the hydrothermal kettle, then water was added until the solid-to-liquid ratio (w/w) was 1:10, with sufficient stirring, and sodium sulfate, sodium chlorate and sulfuric acid were added. The concentration of sodium sulfate in the system was adjusted to 0.5 mol/L, the concentration of sodium chlorate was 0.5 mol/L and the pH value was 2, with sufficient stirring, and the hydrothermal kettle was turned off. The temperature was set at 200° C. and the time for heat preservation was 10 hours. After the heating was stopped, the system was held for 0.5 hour. Other process was the same as that in the Embodiment 1.

The concentration of the leached hexavalent chromium from the original chromium-containing residues in this embodiment was 286 mg/L, and the concentration of the leached hexavalent chromium from the treated filtered residues was 0.84 mg/L.

Embodiment 4

1.5 tons of hexavalent chromium-containing residues were added to the hydrothermal kettle, then water was added until the solid-to-liquid ratio (w/w) was 1:5, with sufficient stirring, and sodium sulfate, sodium chlorate and sulfuric acid were added. The concentration of sodium, sulfate in the system was adjusted to 0.5 mol/L, the concentration of sodium chlorate was 0.1 mol/L and the pH value was 2, with sufficient stirring, and the hydrothermal kettle was turned off. The temperature was set at 180° C. and the time for heat preservation was 3 hours. After the heating was stopped, the system was held for 12 hours. Other process was the same as that in the Embodiment 1.

The concentration of the leached hexavalent chromium from the original chromium-containing residues in this embodiment was 278 mg/L, and the concentration of the leached hexavalent chromium from the treated filtered residues was 0.57 mg/L.

Embodiment 5

2 tons of hexavalent chromium-containing residues were added to the hydrothermal kettle, then water was added until the solid-to-liquid ratio (w/w) was 1:1, with sufficient stirring, and sodium sulfate, sodium chlorate and sulfuric acid were added. The concentration of sodium sulfate in the system was adjusted to 1 mol/L, the concentration of sodium chlorate was 0.1 mol/L and the pH value was 5, with sufficient stirring, and the hydrothermal kettle was turned off. The temperature was set at 200° C. and the time for heat preservation was 6 hours. After the heating was stopped, the system was held for 6 hours. Other process was the same as that in the Embodiment 1.

The concentration of the leached hexavalent chromium from the original chromium-containing residues in this embodiment was 252 mm/L, and the concentration of the leached hexavalent chromium from the treated filtered residues was 0.34 mg/L.

Similarly, technical solutions given according to the protection scope defined by the claims and the description may also give a plurality of embodiments which belong to the protection scope of the present invention.

What is claimed:

1. A detoxification treatment method for extracting and recycling chromium from hexavalent chromium-containing residues, a main component of the residues is particles of calcium sulfate dihydrate which adsorb sodium chromate, characterized in that, the detoxification treatment method comprises steps as follows:
   1) adding water to the hexavalent chromium-containing residues and mixing uniformly, forming a solution;
   2) adding mineralizers to the solution obtained in step 1) and stirring sufficiently to obtain a mixed liquid; and the mineralizers are sodium sulfate, sodium chlorate and sulfuric acid;
   3) treating the mixed liquid obtained in step 2) by a hydrothermal method or direct heating;

4) naturally cooling a solid-liquid mixture obtained in step 3) to room temperature for holding, thereby growing solid calcium sulfate crystals in the residues;
5) separating solid residues and a chromium-containing supernatant, and washing the solid residues with water and then drying;
6) precipitating the supernatant and the water used for washing the solid residues with a precipitant $CaCl_2$, then centrifugally washing, dewatering and drying the precipitates; and
7) recycling a chromium-containing solution obtained in step 6) for a treatment of recycling chromium; the treatment of recycling chromium has specific steps as follows: adding a reductant to the chromium-containing solution, with hexavalent chromium in the solution being reduced to trivalent chromium, then adding a precipitant NaOH to generate precipitate of $Cr(OH)_3$, and finally calcining the precipitate of $Cr(OH)_3$ into $Cr_2O_3$; and the reductant is sodium sulfide or sodium bisulfite.

2. The detoxification treatment method for extracting and recycling chromium from hexavalent chromium-containing residues according to claim 1, wherein a w/w solid-to-liquid ratio after water is added to the hexavalent chromium-containing residues in step 1) is 1:0.5-1:10.

3. The detoxification treatment method for extracting and recycling chromium from hexavalent chromium-containing residues according to claim 1, wherein sodium sulfate in step 2) in the mixed liquid has a concentration of 0.1 mol/L-1 mol/L.

4. The detoxification treatment method for extracting and recycling chromium from hexavalent chromium-containing residues according to claim 1, wherein sodium chlorate in step 2) in the mixed liquid has a concentration of 0.1 mol/L-1 mol/L.

5. The detoxification treatment method for extracting and recycling chromium from hexavalent chromium-containing residues according to claim 1, wherein the mixed liquid in step 2) has a pH value of 1-5.

6. The detoxification treatment method for extracting and recycling chromium from hexavalent chromium-containing residues according to claim 1, wherein a temperature of the hydrothermal method or direct heating in step 3) is controlled between 50° C. and 200° C.

7. The detoxification treatment method for extracting and recycling chromium from hexavalent chromium-containing residues according to claim 1, wherein a time for treating the mixed liquid in step 3) is 2 to 10 hours.

8. The detoxification treatment method for extracting and recycling chromium from hexavalent chromium-containing residues according to claim 1, wherein a time for naturally cooling the solid-liquid mixture in step 4) is 0.5 to 48 hours.

* * * * *